United States Patent
Ahn

(10) Patent No.: US 8,495,725 B2
(45) Date of Patent: Jul. 23, 2013

(54) METHODS, SYSTEMS, AND COMPUTER READABLE MEDIA FOR ADAPTIVE PACKET FILTERING

(75) Inventor: David K. Ahn, Winston-Salem, NC (US)

(73) Assignee: Great Wall Systems, Winston-Salem, NC (US)

( * ) Notice: Subject to any disclaimer, the term of this patent is extended or adjusted under 35 U.S.C. 154(b) by 0 days.

(21) Appl. No.: 12/871,806

(22) Filed: Aug. 30, 2010

(65) Prior Publication Data

US 2011/0055916 A1    Mar. 3, 2011

Related U.S. Application Data

(60) Provisional application No. 61/237,974, filed on Aug. 28, 2009.

(51) Int. Cl.
*H04L 29/06* (2006.01)
(52) U.S. Cl.
USPC ............................................................ 726/11
(58) Field of Classification Search
USPC ............................................ 726/11, 13, 14
See application file for complete search history.

(56) References Cited

U.S. PATENT DOCUMENTS

| | | | |
|---|---|---|---|
| 6,098,172 A | 8/2000 | Coss et al. | |
| 6,484,261 B1 | 11/2002 | Wiegel | |
| 6,662,235 B1 | 12/2003 | Callis et al. | |
| 7,089,581 B1 | 8/2006 | Nagai et al. | |
| 7,107,613 B1 | 9/2006 | Chen et al. | |
| 7,227,842 B1 | 6/2007 | Ji et al. | |
| 7,237,267 B2 | 6/2007 | Rayes et al. | |
| 7,263,099 B1 | 8/2007 | Woo et al. | |
| 7,299,353 B2 | 11/2007 | Le Pennec et al. | |
| 7,331,061 B1 | 2/2008 | Ramsey et al. | |
| 7,954,143 B2 | 5/2011 | Aaron | |

(Continued)

FOREIGN PATENT DOCUMENTS

| | | |
|---|---|---|
| AU | 2005328336 B2 | 1/2012 |
| AU | 2006230171 B2 | 10/2012 |

(Continued)

OTHER PUBLICATIONS

Official Action for U.S. Appl. No. 11/390,976 (Sep. 30, 2010).

(Continued)

*Primary Examiner* — Jeffrey D Popham
(74) *Attorney, Agent, or Firm* — Jenkins, Wilson, Taylor & Hunt, P.A.

(57) ABSTRACT

The subject matter described herein includes methods, systems, and computer readable media for adaptive packet filtering. One method includes identifying at least one subset of rules and an ordered set of firewall packet filtering rules that defines a firewall policy such that the subset contains disjoint rules. Disjoint rules are defined as rules whose order can be changed without changing integrity of the firewall policy. Rules in the subset are sorted to statistically decrease the number of comparisons that will be applied to each packet that a firewall encounters. Packets are filtered at the firewall using the sorted rules in the subset by comparing each packet to each of the sorted rules in the subset until the packet is allowed or denied and ceasing the comparing for the packet in response to the packet being allowed or denied and thereby achieving sub-linear searching for packets filtered using the sorted rules in the subset.

5 Claims, 5 Drawing Sheets

U.S. PATENT DOCUMENTS

| | | | |
|---|---|---|---|
| 8,037,517 | B2 | 10/2011 | Fulp et al. |
| 8,042,167 | B2 | 10/2011 | Fulp et al. |
| 2002/0038339 | A1 | 3/2002 | Xu |
| 2002/0165949 | A1 | 11/2002 | Na et al. |
| 2002/0198981 | A1 | 12/2002 | Corl, Jr. et al. |
| 2003/0120622 | A1 | 6/2003 | Nurmela et al. |
| 2004/0010712 | A1 | 1/2004 | Hui et al. |
| 2004/0177139 | A1 | 9/2004 | Schuba et al. |
| 2004/0193943 | A1 | 9/2004 | Angelino et al. |
| 2004/0205360 | A1* | 10/2004 | Norton et al. .............. 713/201 |
| 2005/0010765 | A1 | 1/2005 | Swander et al. |
| 2005/0114704 | A1* | 5/2005 | Swander .................. 713/201 |
| 2005/0125697 | A1 | 6/2005 | Tahara |
| 2005/0183140 | A1 | 8/2005 | Goddard |
| 2005/0229246 | A1 | 10/2005 | Rajagopal et al. |
| 2005/0251570 | A1 | 11/2005 | Heasman et al. |
| 2005/0286522 | A1* | 12/2005 | Paddon et al. ............ 370/389 |
| 2006/0070122 | A1 | 3/2006 | Bellovin |
| 2006/0104202 | A1 | 5/2006 | Reiner |
| 2006/0195896 | A1* | 8/2006 | Fulp et al. ................. 726/11 |
| 2006/0248580 | A1* | 11/2006 | Fulp et al. ................. 726/11 |
| 2008/0005795 | A1* | 1/2008 | Acharya et al. ............. 726/23 |
| 2008/0077705 | A1* | 3/2008 | Li et al. .................... 709/236 |
| 2008/0301765 | A1 | 12/2008 | Nicol et al. |
| 2009/0138938 | A1 | 5/2009 | Harrison et al. |
| 2009/0172800 | A1* | 7/2009 | Wool ......................... 726/11 |
| 2010/0011433 | A1 | 1/2010 | Harrison et al. |
| 2010/0199346 | A1 | 8/2010 | Ling et al. |
| 2010/0268799 | A1* | 10/2010 | Maestas .................... 709/220 |
| 2010/0303240 | A1 | 12/2010 | Beachem et al. |
| 2011/0055923 | A1 | 3/2011 | Thomas |

FOREIGN PATENT DOCUMENTS

| | | | |
|---|---|---|---|
| EP | 1 006 701 | A2 | 6/2000 |
| EP | 1 484 884 | A2 | 12/2004 |
| KR | 10-20010079361 | | 8/2001 |
| WO | WO 2006/093557 | A2 | 9/2006 |
| WO | WO 2006/105093 | A2 | 10/2006 |
| WO | WO 2011/038420 | A2 | 3/2011 |

OTHER PUBLICATIONS

Office Action for Australian application No. 2006230171 (Sep. 10, 2010).
Office Action for Australian application No. 2005328336 (Aug. 20, 2010).
Notification of Transmittal of the International Search Report and the Written Opinion of the International Searching Authority, or the Declaration for International Application No. PCT/US2010/054520 (Apr. 27, 2011).
Notice of Allowance and Fee(s) Due for U.S. Appl. No. 11/316,331 (Mar. 4, 2011).
Communication pursuant to Rules 70(2) and 70a(2) EPC for European application No. 06758213.0 (Mar. 3, 2011).
Supplementary European Search Report for European application No. 06758213.0 (Feb. 14, 2011).
Fulp, Errin: "Errin Fulp," XP002618346, www.cs.wfu.edu/˜fulp/ewfPub.html, pp. 1-5 (Copyright 2010).
Final Official Action for U.S. Appl. No. 11/316,331 (Jun. 23, 2010).
Interview Summary for U.S. Appl. No. 11/390,976 (Apr. 29, 2010).
Final Official Action for U.S. Appl. No. 11/390,976 (Mar. 26, 2010).
Official Action for U.S. Appl. No. 11/316,331 (Sep. 14, 2009).
Official Action for U.S. Appl. No. 11/390,976 (Jun. 24, 2009).
Notification of Transmittal of the International Search Report and the Written Opinion of the International Searching Authority, or the Declaration for International Application No. PCT/US06/11291 (Jul. 3, 2008).
Communication pursuant to Rules 109 and 110 EPC for European application No. 05857614.1 (Aug. 31, 2007).
Acharya et al., "OPTWALL: A Hierarchical Traffic-Aware Firewall," Department of Computer Science, Telecommunications Program, University of Pittsburgh, pp. 1-11 (2007).
Notification of Transmittal of the International Search Report and the Written Opinion of the International Searching Authority, or the Declaration for International Application No. PCT/US05/47008 (Sep. 11, 2006).
Tarsa et al. "Balancing Trie-Based Policy Representations for Network Firewalls," Department of Computer Science, Wake Forest University, pp. 1-6 (2006).
Fulp, "Trie-Based Policy Representations for Network Firewalls," Proceedings of the IEEE International Symposium on Computer Communications (2005).
E. Fulp, "Optimization of Network Firewall Policies Using Ordered Sets and Directed Acyclical Graphs", Technical Report, Computer Science Department, Wake Forest University, Jan. 2004.
E. Fulp et al., "Network Firewall Policy Tries", Technical Report, Computer Science Department, Wake Forest University, 2004.
E. Al-Shaer et al., "Modeling and Management of Firewall Policies", IEEE Transactions on Network and Service Management, 1(1): 2004.
E.W. Fulp, "Firewall Architectures for High Speed Networks", U.S. Department of Energy Grant Application, Funded Sep. 2003.
E. Al-Shaer et al., "Firewall Policy Advisor for Anomaly Discovery and Rule Editing", Proceedings of the IFIP/IEEE International Symposium on Integrated Network Management, 2003.
V.P. Ranganath, "A Set-Based Approach to Packet Classification", Proceedings of the IASTED International Conference on Parallel and Distributed Computing and Systems, 889-894, 2003.
M. Christiansen et al., "Using IDDs for Packet Filtering", Technical Report, BRICS, Oct. 2002.
Lee et al., "Development Framework for Firewall Processors," IEEE, pp. 352-355 (2002).
L.Qui et al., "Fast Firewall Implementations for Software and Hardware-Based Routers", Proceedings of ACM Sigmetrics, Jun. 2001.
D. Eppstein et al. "Internet Packet Filter Management and Rectangle Geometry", Proceedings of the Symposium on Discrete Algorithms, 827-835, 2001.
E. Fulp, "Preventing Denial of Service Attacks on Quality of Service", Proceedings of the 2001 DARPA Information Survivability Conference and Exposition II, 2001.
S. Goddard et al., "An Unavailability Analysis of Firewall Sandwich Configurations", Proceedings of the $6^{th}$ IEEE Symposium on High Assurance Systems Engineering, 2001.
G.V. Rooij, "Real Stateful TCP Packet Filtering in IP Filter", Proceedings of the $10^{th}$ USENIX Security Symposium, 2001.
P. Warkhede et al., "Fast Packet Classification for Two-Dimensional Conflict-Free Filters", Proceedings of IEEE INFOCOM, 1434-1443, 2001.
D. Decasper et al., "Router Plugins: A Software Architecture for Next-Generation Routers", IEEE/ACM Transactions on Networking, 8(1): Feb. 2000.
A. Feldmann et al., "Tradeoffs for Packet Classification", Proceedings of the IEEE INFOCOM, 397-413, 2000.
X. Gan et al., "LSMAC vs. LSNAT: Scalable Cluster-based Web servers", Journal of Networks, Software Tools, and Applications, 3(3): 175-185, 2000.
A. Hari et al., "Detecting and Resolving Packet Filter Conflicts", Proceedings of IEEE INFOCOM, 1203-1212, 2000.
O. Paul et al., "A Full Bandwidth ATM Firewall", Proceedings of the $6^{th}$ European Symposium on Research in Computer Security ESORICS'2000, 2000.
J. Xu et al., "Design and Evaluation of a High-Performance ATM Firewall Switch and Its Applications", IEEE Journal on Selected Areas in Communications, 17(6): 1190-1200, Jun. 1999.
C. Benecke, "A Parallel Packet Screen for High Speed Networks", Proceedings of the $15^{th}$ Annual Computer Security Applications Conference, 1999.
R. Funke et al., "Performance Evaluation of Firewalls in Gigabit-Networks", Proceedings of the Symposium on Performance Evaluation of Computer and Telecommunication Systems, 1999.
S. Suri et al., "Packet Filtering in High Speed Networks", Proceedings of the Symposium on Discrete Algorithms, 969-970, 1999.
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
M. Degermark et al., "Small Forwarding Tables for Fast Routing Lookups", Proceedings of ACM SIGCOMM, 4-13, 1997.

S.M. Bellovin et al., "Network Firewalls", IEEE Communications Magazine, 50-57, 1994.

W.E. Leland et al., "On the Self-Similar Nature of Ethernet Traffic", IEEE Transactions on Networking, 2(1): 15, 1994.

G. Brightwell et al., "Counting Linear Extensions is #P-Complete", Proceedings of the Twenty-Third Annual ACM Symposium on Theory of Computing, 1991.

M. Al-Suwaiyel et al., "Algorithms for Trie Compaction", ACM Transactions on Database Systems, 9(2): 243-263, Jun. 1984.

D. Comer, "Analysis of a Heuristic for Full Trie Minimization", ACM Transactions on Database Systems, 6(3): 513-537, Sep. 1981.

R.L. Graham et al., "Optimization and Approximation in Deterministic Sequencing and Scheduling: A Survey", Annals of Discrete Mathematics, 5: 287-326, 1979.

E.L. Lawler, "Sequencing Jobs to Minimize Total Weighted Completion Time Subject to Precedence Constraints", Annals of Discrete Mathematics, 2: 75-90, 1978.

J.K. Lenstra et al., "Complexity of Scheduling Under Precedence Constraints", Operations Research, 26(1): 22-35, 1978.

R. Rivest, "On Self-Organizing Sequential Search Heuristics", Communications of the ACM, 19(2): 1976.

W.E. Smith, "Various Optimizers for Single-Stage Production", Naval Research Logistics Quarterly, 3: 59-66, 1956.

Bellion, "High Performance Packet Classification", http://www.hipac.org (Publication Date Unknown).

Notice of Allowance and Fee(s) Due for U.S. Appl. No. 11/390,976, (Jun. 9, 2011).

Communication pursuant to Article 94(3) EPC for European Application No. 06 758 213.0 (Oct. 18, 2011).

Extended Search Report for European Patent Application No. 05857614.1 (Jun. 26, 2012).

Notice of Acceptance for Australian Patent Application No. 2006230171 (Jun. 9, 2012).

Second Office Acton for Austrailian Patent Application No. 2006230171 (Nov. 11, 2011).

Office Action for Canadian Patent Application No. 2,600,236 (Jan. 17, 2013).

Office Action for Canadian Patent Application No. 2,594,020 (Jan. 16, 2013).

Communication under rule 71(3) EPC for European Application No. 06 758 213.0 (Nov. 20, 2012).

* cited by examiner

METHODS, SYSTEMS, AND COMPUTER READABLE MEDIA FOR ADAPTIVE PACKET FILTERING

PRIORITY CLAIM

This application claims the benefit of U.S. Provisional Patent Application Ser. No. 61/237,974, filed Aug. 28, 2009; the disclosure of which is incorporated herein by reference in its entirety.

TECHNICAL FIELD

The subject matter described herein relates to network firewall filtering. More particularly, the subject matter described herein relates to methods, systems, and computer readable media for adaptive packet filtering.

BACKGROUND

A firewall generally processes a packet against a list of ordered rules to find the first rule match. The list of ordered rules represents an aggregate security policy, and arbitrarily changing the order of the rules can result in a violation of the aggregate security policy. The Wake Forest University (WFU) techniques described in U.S. patent application publication nos. 2006/0248580 and 2006/0195896 provide the methods to optimally reorder the list while preserving the aggregate security policy, thereby improving the performance of the firewall. The WFU techniques also include methods to break apart rules into functionally independent lists containing (groups of) dependent rules such that a function parallel firewall can simultaneously process one packet against multiple lists, which can substantially improve the performance of the firewall. However, these improvements provided by WFU techniques can be dwarfed by the performance degradation as the number of rules in the list becomes very large.

A key reason for the lack of scalability of most firewall implementations is due to the common use of linear search algorithms for comparing packets against a list of rules. In the worst case, a packet is matched at the last $N^{th}$ rule in the list, so it must also be compared against all N−1 prior rules for a total of N comparisons. This poses a computational resource problem when the size of N is very large on a single processing node (including when such nodes are arranged in a data-, function-, hierarchical- or hybrid-parallel system), where the time required for processing each packet can quickly increase latency and reduce throughput to unacceptable levels. In fact, the WFU techniques provide good results in part because the reordering of, or the reduction in size of, rules on each processing node allows for a larger percentage of the total rules to reside in each processor's cache(s), which then substantially increases their performance relative to when only a small portion of those rules are cached.

The problem of searching firewall rule sets is well understood and highly researched, and there are some published techniques for sub-linear (substantially faster than linear) techniques applicable to firewall rules. However, these sub-linear techniques generally involve changing the underlying representation of rules. Examples of such an approach might be to use a graph, trie- or tree-like structure instead of a list to represent a set of rules, which would allow a match to be determined using tree search algorithms by traversing down the graph, trie or tree (see E. Fulp, Trie-Based Policy Representations for Network Firewalls, Proceedings of the IEEE International Symposium on Computer Communications, 2005 and Al-Shaer et al., Modeling and Management of Firewall Policies, IEEE Transactions on Network and Service Management, 2004). These approaches have potential but can add complexity or limitations that may reduce their practical usefulness in a commercial high performance firewall product.

SUMMARY

Adaptive packet filtering (APF), a set of techniques for processing firewall rules and packets, is described herein. APF offers improved processing performance compared to the WFU techniques in most cases, and can be combined with the WFU techniques or other parallel, pipelining and optimization techniques to achieve even greater performance.

The subject matter described herein includes methods, systems, and computer readable media for adaptive packet filtering. One method includes identifying at least one subset of rules in an ordered set of firewall packet filtering rules that defines a firewall policy such that the subset contains disjoint rules. Disjoint rules are defined as rules whose order can be changed without changing the integrity of the firewall policy. Rules in the subset are sorted to statistically decrease the number of comparisons that will be applied to each packet that a firewall encounters. Packets are filtered at the firewall using the sorted rules in the subset by using binary search, interpolated search, informed search, or hash lookup search algorithms to compare each packet to the sorted rules in the subset until the packet is allowed or denied and ceasing the comparing for the packet in response to the packet being allowed or denied and thereby achieving sub-linear searching for packets filtered using the sorted rules in the subset.

The subject matter described herein for adaptive packet filtering can be implemented in a non-transitory computer readable medium having stored thereon executable instructions that when executed by the processor of a computer control the computer to perform steps. Exemplary computer readable media suitable for implementing the subject matter described herein include chip memory devices, disk memory devices, programmable logic devices and application specific integrated circuits. In addition, a computer readable medium that implements a subject matter described herein may be located on a single device or computing platform or may be distributed across multiple devices or computing platforms.

Further, the subject matter described herein for adaptive packet filtering can be implemented on a particular machine, such as a network firewall including one or more network interfaces for receiving packets and packet filtering hardware and software for optimizing rules as described herein and for filtering packets using the optimized arrangement of rules.

BRIEF DESCRIPTION OF THE DRAWINGS

Preferred embodiments of the subject matter described herein will now be described with reference to the accompanying drawings of which.

DETAILED DESCRIPTION

Figure 1:
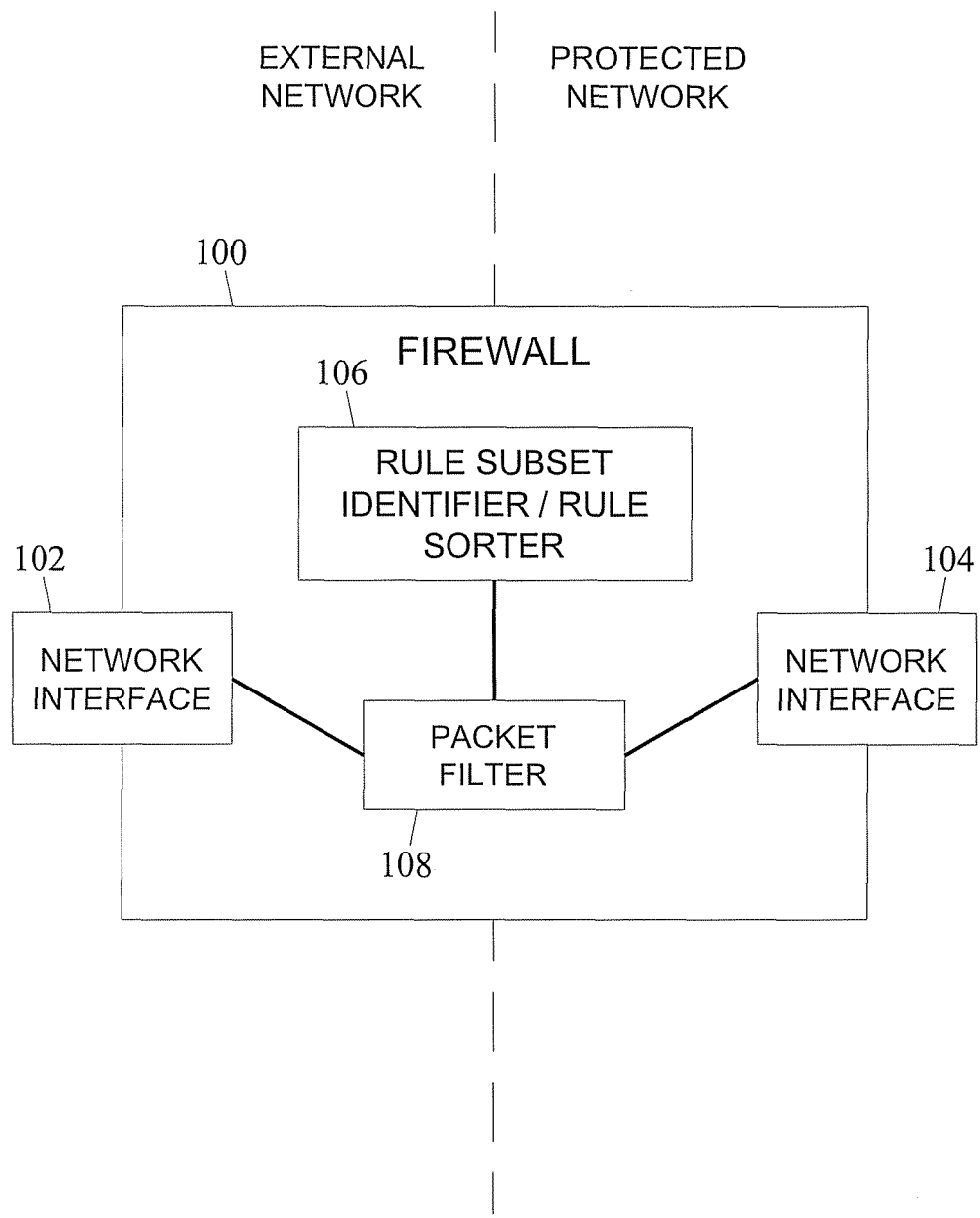
FIG. 1 is a block diagram of a system for adaptive packet filtering according to an embodiment of the subject matter described herein.

Methods, systems, and computer readable media for adaptive packet filtering are disclosed. FIG. 1 is a block diagram illustrating an exemplary system for adaptive packet filtering according to an embodiment of the subject matter described herein. Referring to FIG. 1, a firewall 100 may function at the boundary between an external network and a protected network. Firewall 100 may include one or more network interfaces 102 for receiving packets from the external network. Firewall 100 may also include one or more network interfaces 104 for transmitting allowed packets to the protected network. In one implementation, firewall 100 may filter Internet protocol (IP) packets based on a combination of source and destination addresses in the IP headers of the packets. However, the subject matter described herein is not limited to filtering any particular protocol. Any packet network protocol with parameters for which firewall filtering rules can be defined is intended to be within the scope of the subject matter described herein.

As used herein, the term "firewall" includes any network security device or system of devices that inspects network traffic data that originates, terminates, or traverses the device system in any capacity and compares that traffic data (headers, payload, raw bits, etc.) to a set of one or more rules, signatures, or conditions, either inline (i.e., in real time) or offline (i.e., capture and replay of the traffic data). The term "firewall" is also intended to include an intrusion detection device that analyzes network traffic in real time or historically to detect the presence of intrusion events in a network. The term "firewall" is also intended to include a deep packet inspection device that analyzes network traffic in real time or historically to detect the presence of certain packet content in a network.

Firewall 100 includes a firewall rule subset identifier/rule sorter 106 for identifying at least one subset of rules in an ordered set of firewall packet filtering rules that defines a firewall policy such that the subset contains disjoint rules, where disjoint rules are defined as rules whose order can be changed without changing the firewall policy. Firewall rule subset identifier/rule sorter 106 may sort the rules in the subset or subsets to statistically decrease the number of comparison that will be applied to each packet that the firewall encounters. Exemplary methods for grouping and sorting rules will be described below.

Although in the example illustrated in FIG. 1 rule subset identifier/rule sorter 106 is illustrated as a component of firewall 100, the subject matter described herein is not limited to such an implementation. Rule subset identifier/rule sorter 106 can be implemented on any computing platform capable of sorting firewall rules using the methods described herein, and the sorted rule set can be provided to firewall 100 through any suitable means, such as communication over a network. In one implementation, rule subset identifier/rule sorter 106 may be implemented on a management platform separate from firewall 100.

Firewall 100 further includes a packet filter 108 for filtering packets at the firewall using the rules in the subset by using binary search, interpolated search, informed search, hash lookup search algorithms, or other sub-linear algorithms to compare each packet to each of the sorted rules in the subset until the packet is allowed or denied and ceasing the comparing for the packet in response to the packet being allowed or denied and thereby achieving sub-linear searching for the packets filtered using the sorted rules in the subset.

Figure 2:
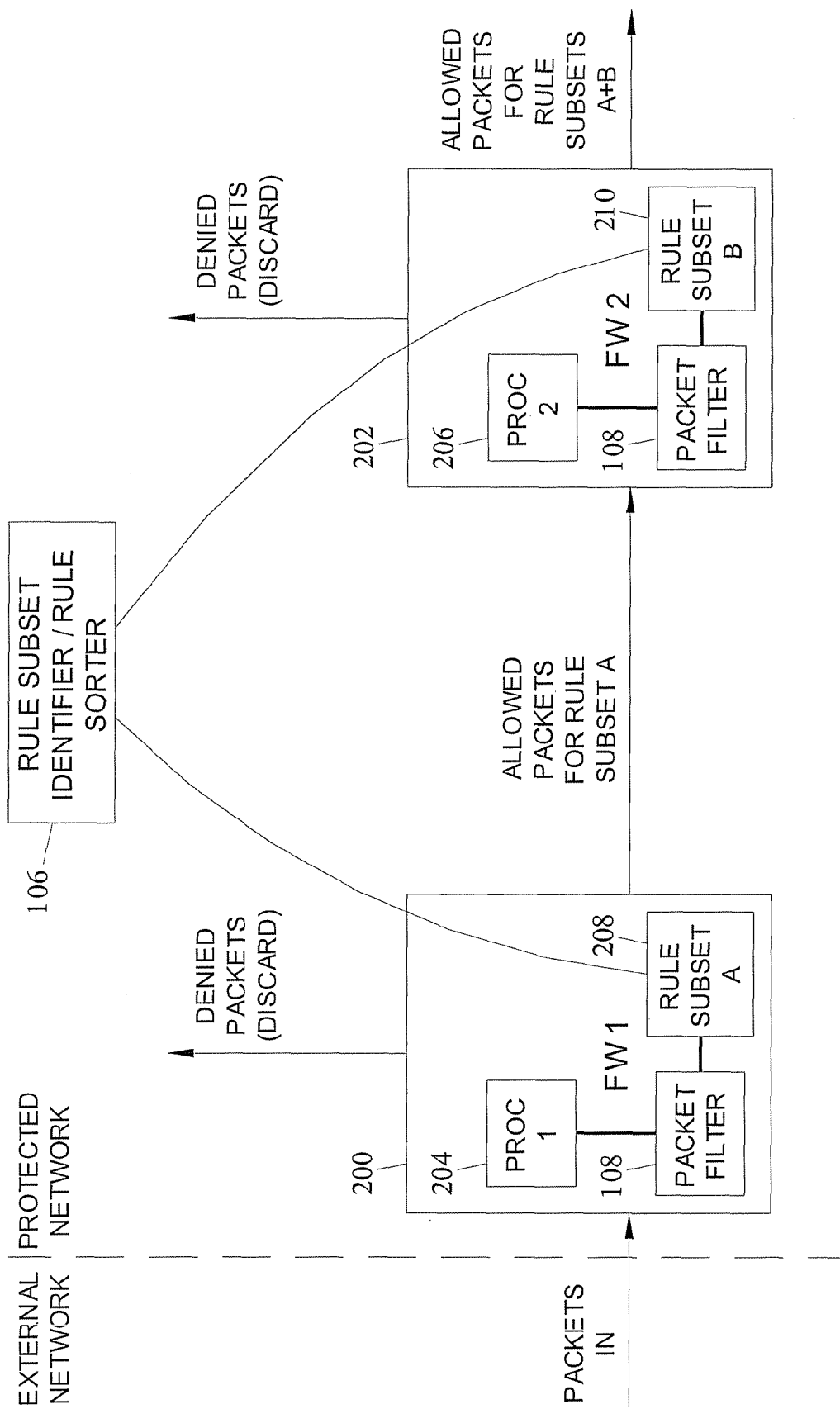
FIG. 2 is a block diagram of application of the present subject matter to a pipelined processing approach according to an embodiment of the subject matter described herein.

Once the subsets of disjoint rules have been identified by rule subset identifier/rule sorter 106, the rule subsets can be distributed across plural firewall processors in order to improve packet filtering efficiency. FIG. 2 is a block diagram illustrating an exemplary pipelined approach where rules and different subsets are distributed across plural firewall processors for processing packets in a pipelined manner. Referring to FIG. 2, firewalls 200 and 202 each include separate processors 204 and 206 for executing packet filters 108. In this example, rule subset identifier/rule sorter 106 identifies two rule subsets, subset A 208 and subset B 210. The rules within each subset 208 and 210 are disjoint and sorted to statistically decrease the number of comparisons that will be applied to each packet using the methods described herein. However, the rules in subset B 210 are dependent on the rules in rule subset A 208. Accordingly, rule subset identifier/rule sorter 106 distributes the rule across firewall processors 204 such that the rules in rule subset A 208 are applied before the rules in rule subset B 210. Because the rules in different subsets are distributed across plural processors in a pipeline manner, packet filtering efficiency is improved over a single-processor approach because the different processors can simultaneously apply rules to different packets. In the example illustrated in FIG. 2, packets that pass the filtering of rule subset A 208 are processed by processor 206, which applies rule subset B 210, at the same time that processor 204 applies rule subset A to new incoming packets.

Figure 3:
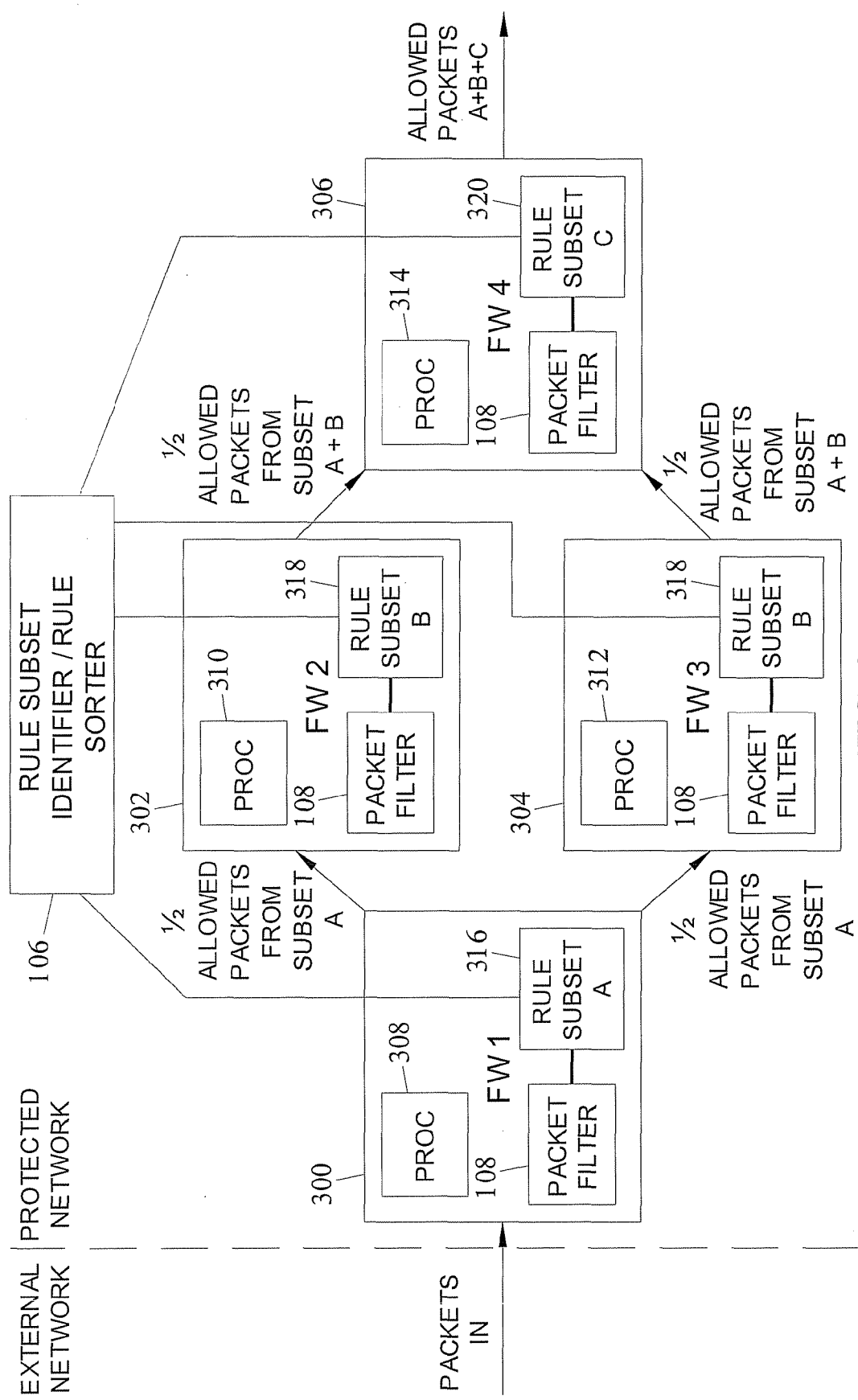
FIG. 3 is a block diagram illustrating application of the present subject matter to a combination of pipelined and data parallel processing approaches according to an embodiment of the subject matter described herein.

In yet another embodiment, rule subset identifier/rule sorter 106 may distribute the grouped, sorted rules across firewall processors such that a combination of pipelined and data parallel processing techniques are used. FIG. 3 illustrates an example where firewalls 300, 302, 304, and 306 each include separate processors 308, 310, 312, and 314 for applying their respective packet filters. In the illustrated example, rule subset identifier/rule sorter 106 distributes rule subset A 316 to firewall 300, rule subset B 318 to firewalls 302 and 304, and rule subset C 320 to firewall 306. The rules within each subset A, B and C are disjoint. The rules in subset B are dependent upon the rules in subset A. The rules in subset C are dependent upon the rules in subsets A and B.

In operation, packets entering firewall 300 are filtered using rule subset A 316. The packets that are allowed by rule subset A 316 are divided between firewalls 302 and 304 such that the application of the rules in rule subset B 318 to different packets is performed in parallel. This is referred to as a data parallel approach. The packets that pass the filtering by rule subset B 318 are passed to firewall 306 for application of the rules in rule subset C 320. Accordingly, FIG. 3 illustrates an example where the rule subsets that are identified and sorted by rule subset identifier/rule sorter 106 are distributed across the firewall processors for a combination of pipelined and data parallel processing.

Figure 4:
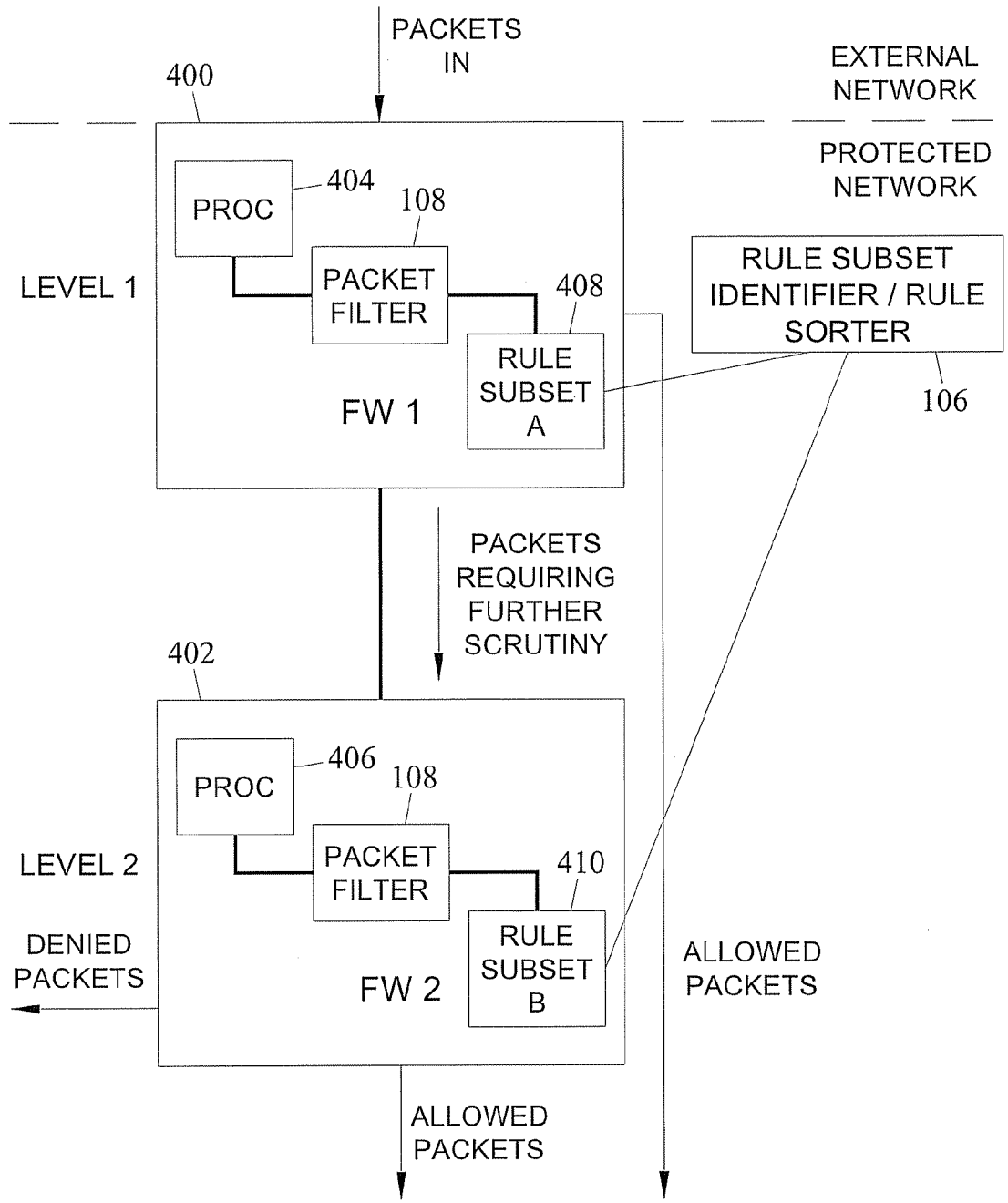
FIG. 4 is a block diagram illustrating application of the present subject matter to a short-circuiting pipelined processing approach according to an embodiment of the subject matter described herein.

In yet another embodiment, the rules subsets that are identified and in which the rules are sorted using rule subset identifier/rule sorter 106 may be distributed across firewall processors in a short-circuiting pipelined manner. FIG. 4 is an example of short-circuiting pipelined filtering using rule subsets that are identified and sorted by rule subset identifier/rule sorter 106. Referring to FIG. 4, a first firewall 400 and a second firewall 402, respectively including processors 404 and 406, filter packets using packet filters 108. In the illustrated example, packet filter 108 uses rule subset A 408 and packet filter 108 uses rule subset B 410. Rule subsets A and B 408 and 410 may respectively implement different levels of a firewall hierarchy such that packets that pass the filtering by rule subset A 408 are allowed into the protected network. Packets that are identified by rule subset A 408 is requiring further filtering are distributed to rule subset B 410 for that filtering. Thus, rule subset identifier/rule sorter 106 can also be used with short-circuiting pipelined firewall techniques without departing from the scope of the subject matter described herein.

Figure 5:
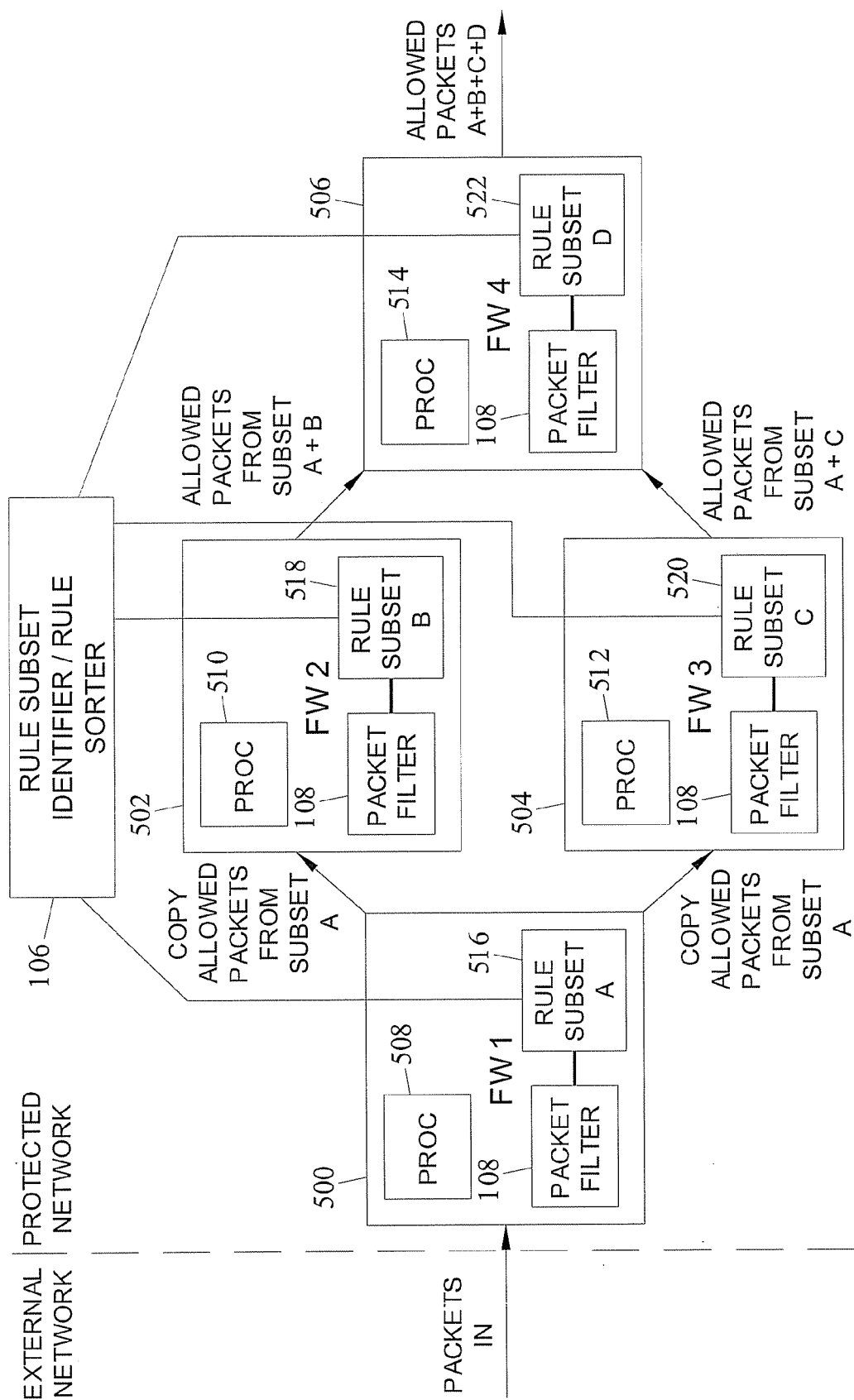
FIG. 5 is a block diagram illustrating application of the present subject matter to a combination of pipelined and function parallel processing approaches according to an embodiment of the subject matter described herein.

In yet another embodiment, rule subset identifier/rule sorter 106 may distribute the grouped, sorted rules across firewall processors such that a combination of pipelined and function parallel processing techniques are used. FIG. 5 illustrates an example where firewalls 500, 502, 504, and 506 each include separate processors 508, 510, 512, and 514 for applying their respective packet filters. In the illustrated example, rule subset identifier/rule sorter 106 distributes rule subset A 516 to firewall 500, rule subset B 518 to firewalls 502, and rule subset C 520 to firewall 504, and rule subset D 522 to firewall 506. The rules within each subset A, B, C and D are disjoint. The rules in subset B and C are dependent upon the rules in subset A. The rules in subset D are dependent upon the rules in subsets A, B and C.

In operation, packets entering firewall 500 are filtered using rule subset A 516. The packets that are allowed by rule subset A 516 are copied to both firewalls 502 and 504 such that the application of the rules in rule subsets B 518 and C 520 to the packets is performed in parallel. This is referred to as a function parallel approach. The packets that pass the filtering by rule subsets B 518 and C 520 are passed to firewall 506 for application of the rules in rule subset D 522. Accordingly, FIG. 5 illustrates an example where the rule subsets that are identified and sorted by rule subset identifier/rule sorter 106 are distributed across the firewall processors for a combination of pipelined and function parallel processing.

TECHNIQUE

APF analyzes and orders the list of firewall rules in-place to contain functionally dependent groups, where each group contains a subset of rules that are disjoint, dependent or both, without substantially changing the underlying representation of rules and while preserving the aggregate security policy. APF then uses varying criteria to sort each group containing disjoint rules, then uses sub-linear search algorithms when comparing packets against the rules within that group. APF uses linear search algorithms when comparing packets within a group containing dependent rules or when otherwise appropriate. A detailed computational complexity analysis of APF would need to be completed. However, on average, it is hypothesized that only O(log(N)) comparisons would be needed to process a rule list of size N. In the theoretical best case when all rules are disjoint, this translates to about 20 comparisons (instead of 1,000,000) for a list of N=1,000,000 rules and about 30 comparisons for a list of N=1,000,000,000 rules. In the worst case when all rules are dependent, APF performs the same as linear search firewall cores. In practice, APF should process a packet against a very large list of rules (N=millions) in the same amount of time that other techniques can process against a very small list (N=hundreds, or thousands). APF does not inherently use parallel techniques; therefore, it can be combined with WFU techniques or other parallel/pipelining techniques to increase performance.

The following table shows preliminary results comparing a single linear search firewall) with a single APF core as the number of rules is increased.

|  | linear firewall core | | APF core | |
| --- | --- | --- | --- | --- |
| N = # rules in the core | PPS = packets per second at max throughout with 0 loss | Latency in microseconds at max throughput with 0 loss | PPS = packets per second at max throughout with 0 loss | Latency in microseconds at max throughput with 0 loss |
| 1 | 844,595 | 12.3 | 811,688 | 12.3 |
| 10 | 730,994 | 11.9 | 766,871 | 12.3 |
| 100 | 314,861 | 13.9 | 718,391 | 12.0 |
| 1,000 | 29,357 | 44.6 | 683,060 | 12.0 |
| 10,000 | 930 | 1,112.4 | 464,684 | 12.0 |
| 100,000 | Fail | Fail | 292,740 | 17.4 |
| 1,000,000 |  |  | 252,525 | 14.3 |
| 10,000,000 |  |  | 132,556 | 18.6 |

DETAILED TECHNIQUE

This section describes an exemplary algorithm for implementing the subject matter described herein.

A firewall rule is defined as an n-tuple criteria and an associated action for matching packets. For example, a 5-tuple rule that matches Internet Protocol version 4 (IPv4) packets might consist of 5 IPv4 header fields (source address, source port, destination address, destination port and protocol) and an action (allow, deny), and might specify the rule R1 as:

| Rule | Source Addr | Source Port | Dest Addr | Dest Port | Protocol | Action |
| --- | --- | --- | --- | --- | --- | --- |
| R1 | 192.168.1.1 | 12345 | 10.1.1.1 | 80 | TCP | DENY |

A firewall rule set is defined as an ordered list of n rules R1, R2, R3, . . . , Rn where the i in Ri is the index of the rule in the list. Packets that traverse the firewall are checked against each rule in the rule set until the first matching rule is found and its associated action is applied. An example rule set is S1 which contains:

| Rule | Source Addr | Source Port | Dest Addr | Dest Port | Protocol | Action |
|---|---|---|---|---|---|---|
| R1 | 192.168.1.1 | 12345 | 10.1.1.1 | 80 | TCP | DENY |
| R2 | 192.168.2.2 | ANY | 10.2.2.2 | 25 | TCP | ALLOW |
| R3 | 192.168.3.3 | ANY | 10.3.3.3 | 53 | UDP | ALLOW |
| R4 | ANY | ANY | 10.1.1.1 | ANY | ANY | ALLOW |
| R5 | ANY | ANY | ANY | ANY | ANY | DENY |

An example TCP packet from source 192.168.4.4 port 54321 to destination 10.1.1.1 port 80 would be checked against but not match R1, R2 and R3; would be checked against and match R4 and be allowed; and, would not be checked against R5 because R4 was the first matching rule.

A firewall security policy is defined as the set of all possible packets that can traverse the firewall along with their specified outcomes as defined by the rule set. Changing the rules in a rule set usually results in a change of its security policy.

Within a rule set, a firewall rule is dependent on another rule if swapping the order of the two rules results in a change in the security policy of the rule set. Otherwise, the two rules are disjoint if swapping the order does not result in a change the security policy. For example, in rule set S1 above, rules R1 and R4 are dependent because placing R4 ahead of R1 would render R1 ineffective, thereby changing the security policy. Rules R1 and R2 are disjoint because placing R2 ahead of R1 does not change the security policy.

A permutation of a rule set is defined as a new rule set which contains the same rules as the original rule set, but which lists a different ordering of the rules from the original rule set without changing the original security policy. For example, in the rule set S1 above, swapping the order of the disjoint rules R1 and R2 would result in a permutation rule set S1':

| Rule | Source Addr | Source Port | Dest Addr | Dest Port | Protocol | Action |
|---|---|---|---|---|---|---|
| R2 | 192.168.2.2 | ANY | 10.2.2.2 | 25 | TCP | ALLOW |
| R1 | 192.168.1.1 | 12345 | 10.1.1.1 | 80 | TCP | DENY |
| R3 | 192.168.3.3 | ANY | 10.3.3.3 | 53 | UDP | ALLOW |
| R4 | ANY | ANY | 10.1.1.1 | ANY | ANY | ALLOW |
| R5 | ANY | ANY | ANY | ANY | ANY | DENY |

Two rules are spatially disjoint if they are disjoint and their corresponding tuples are either identical or do not overlap. For example, in the rule set S1 above, rules R1 and R2 are disjoint but not spatially disjoint because the source ports 12345 and ANY overlap. However, rules R2 and R3 are both disjoint and spatially disjoint because the source ports ANY and ANY are identical, and the other 4 tuples do not overlap. (Other examples follow.)

A transform function is an algorithm that can be applied to a rule to create a sortable key for that rule, which can then be used to sort the rules by their keys using a key comparison function. For example, the transform function Tfn could concatenate the tuples of a rule into a bit array that is interpreted as a large integer, and a corresponding comparison function Cfn could be a simple integer comparison function. (Other examples follow.)

A rule subset is defined as an ordered grouping of one or more rules within a rule set. For example, in rule set S1 above, the rule subsets might be:

| Subset | Rules |
|---|---|
| T1 | R1, R2, R3 |
| T2 | R4 |
| T3 | R5 |

A rule group is defined as a rule subset with a group type (dependent, disjoint), transform function, comparison function, and a search algorithm hint (linear, sub-linear). The group type can be dependent if the group contains dependent rules, or can be disjoint if the group strictly contains disjoint rules. For example, the rule set S1 above might contain the following disjoint rule group:

| Group | Group Type | Rules | Transform Fn | Comparison Fn | Hint |
|---|---|---|---|---|---|
| G1 | Disjoint | R1, R2, R3 | Tfn | Cfn | Sub-linear |

A rule set may be partitioned into a list of ordered rule groups such that the security policy of the rule set is not changed when each rule group is decomposed in the listed order. This partitioning is accomplished by applying a rule subset identification method to a given rule set. An example of such a method is:

1. For a given rule set S containing n rules R1, R2, ..., Rn:
   a. Create a new empty disjoint rule group Gj (initially G1) in S.
   b. Place the first ungrouped rule Ri (initially R1) into Gj.
   c. For each remaining ungrouped rule Ri in S:
      i. If Ri is disjoint from rules in Gj and placing Ri into Gj does not modify the security policy of S, then place Ri into Gj.
      ii. Otherwise, leave Ri ungrouped.
   d. If S contains ungrouped rules, then go to step 1.a.
2. The rule set S now contains m disjoint rule groups G1, G2, G3, ..., Gm which group together the n (possibly reordered) rules R1, R2, ..., Rn.

Applying the above method to rule set S1 might result in its partitioning into the following list of disjoint ordered rule groups:

| Group | Group Type | Rules | Transform Fn | Comparison Fn | Hint |
|---|---|---|---|---|---|
| G1 | Disjoint | R1, R2, R3 | | | Linear |
| G2 | Disjoint | R4 | | | Linear |
| G3 | Disjoint | R5 | | | Linear |

Decomposing the disjoint rule groups would result in G1, G2, G3=[R1, R2, R3], [R4], [R5]=R1, R2, R3, R4, R5=S1.

A partitioned rule set containing disjoint rule groups may then be sorted by applying a transform function to each rule within each disjoint group to derive a sortable key for each rule. Then, the rules may be reordered within their disjoint groups using their sortable keys. The resulting sorted groups may be searched using sub-linear searching algorithms. An example of the sorting method is:

1. For each disjoint group Gj in rule set S:
   a. For each rule Ri in Gj:
      i. Apply Transform Tfn to Ri to derive a sortable key Ki.
   b. Sort the rules in Gj using the comparison function Cfn on the sortable keys K.
3. The rule set S now contains m sorted disjoint rule groups G1, G2, G3, . . . , Gm.

Applying the above method to the partitioned rule set S1 might result in a new permutation rule set S1' that contains the following list of sorted rule groups where the ordering of rules within G1 might change from R1, R2, R3 to R3, R1, R2:

| Group | Group Type | Rules | Transform Fn | Comparison Fn | Hint |
|-------|------------|-------|--------------|---------------|------|
| G1 | Disjoint | R3, R1, R2 | Tfn | Cfn | Sub-linear |
| G2 | Disjoint | R4 | Tfn | Cfn | Sub-linear |
| G3 | Disjoint | R5 | Tfn | Cfn | Sub-linear |

The permutated rule set containing disjoint rule groups may be consolidated to reduce the number of groups that contain a rule count at or below a certain threshold, such as 1 rule, by merging two or more consecutive disjoint groups into a larger dependent group that may be searched using linear searching algorithms. An example of the consolidation method is:

1. For each group Gj in rule set S:
   a. If the sum of the number of rules in Gj and its subsequent group Gj+1 is less than or equal to a specified threshold (e.g. 1), then the two groups are merged, their rules are concatenated, and the group type is set to dependent.
2. The rule set S now contains m or fewer rule groups of both dependent and disjoint types.

Applying the above method to the permuted rule set S1' might merge the disjoint group G3 into G2:

| Group | Group Type | Rules | Transform Fn | Comparison Fn | Hint |
|-------|------------|-------|--------------|---------------|------|
| G1 | Disjoint | R3, R1, R2 | Tfn | Cfn | Sub-linear |
| G2 | Dependent | R4, R5 | (none) | (none) | Linear |

The APF packet filtering method matches packets against a given rule set by sequentially iterating over each of the ordered rule groups, then performing the specified sub-linear or linear search within each group. An example of a rule filtering method is:

1. For each packet that traverses the firewall:
   b. For each group Gj in rule set S:
      i. If Gj is a dependent group, then perform linear search within that group until there is a first rule match.
      ii. If Gj is a disjoint group:
         1. Apply transform T to the packet to derive a lookup key K.
         2. Use the comparison function C and sub-linear search within the group until there is a first rule match on key K.
      iii. If there is a first rule match, then process the packet according to its specified action. Otherwise, continue to the next group Gj+1.

ADDITIONAL NOTES

The primary purpose of the partitioning of rules is to create rule groups that, in aggregate, enable the fastest possible searching of each packet against the rules in the rule set. In most cases, the optimal partitioning should be the grouping of maximal subsets of spatially disjoint rules. However, in some cases where these disjoint groups are small (e.g. less than 10 rules), consolidating the disjoint groups into a single larger group containing rules that are ordered using other criteria (such as hit probabilities or hardware cache friendliness) and employing linear or interpolated search algorithms may improve performance. A critical concept is the flexibility to organize the rules within the rule set in different ways that enable the use of the most efficient and applicable search algorithm that is available that accounts for the hardware capabilities, which is the motivation behind the term "adaptive" in Adaptive Packet Filtering.

Rule sets may be partitioned, sorted and consolidated in-place.

When partitioning a rule set into rule groups, each disjoint group should generally contain the maximal subsets of disjoint rules in order to reduce the number of disjoint groups in the rule set.

When partitioning a rule set into rule groups and/or sorting those groups, the transform and comparison functions may be different for each rule group.

When partitioning a rule set into rule groups and/or sorting those groups, the algorithms may account for the hit probabilities of each rule and the aggregate hit probabilities of each group.

When filtering packets, the search performed within any given rule group may employ the fastest available search algorithm applicable to that group even if it may be different from the specified search algorithm hint.

When filtering packets, a sub-linear binary search within a disjoint rule group may account for hit probabilities at each pivot so that each recursion could maximize the probability of a rule match.

When filtering packets, a constant-time search within a disjoint rule group is possible by defining a hashing function as the transform function such that the hash values for all rules within a group are unique within that group.

EXAMPLES

This section provides examples of the following items described in the algorithm in the previous section.
1) Example of the rule breakup
2) Example of transform function
3) Definition of rule representation
4) Difference between sub-linear and linear
5) Explanation of disjoint rules
1) Examples of the Rule Breakup
   Define
   S1=(R1, R2, R3, R4, R5)
   and
   R1=from 1.2.3.4 to 3.4.5.6 deny
   R2=from 2.3.4.5 to 4.5.6.7 allow
   R3=from 3.4.5.6 to 5.6.7.8 allow
   R4=from *.*.*.* to 3.4.5.6 allow
   R5=from *.*.*.* to *.*.*.* deny
   Then S1' contains 3 groups of disjoint rules:
   S1'=(G1, G2, G3)
   G1=(R1, R2, R3)

G2=(R4)
G3=(R5)
Or, S1' can contain 2 groups of disjoint and dependent rules:
S1'=(G1, G2)
G1=(R1, R2, R3), disjoint, sub-linear
G2=(R4, R5), dependent, linear
or
Define
S2=(R1, R2, R3, R4, R5, R6, R7, R8, R9)
and
R1=from 1.2.3.4 to 3.4.5.6 deny
R2=from 2.3.4.5 to 4.5.6.7 allow
R3=from 1.2.3.4 to 4.5.6.7 deny
R4=from 1.*.*.* to *.*.*.* allow
R5=from 3.4.5.6 to 5.6.7.8 deny
R6=from 2.*.*.* to *.*.*.* deny
R7=from *.*.*.* to 3.4.5.6 allow
R8=from *.*.*.* to 5.6.7.8 allow
R9=from *.*.*.* to *.*.*.* deny
Then S2' contains 4 groups of "spatially disjoint" rules:
S2'=(G1, G2, G3, G4)
G1=(R1, R2, R3, R5)
G2=(R4, R6)
G3=(R7, R8)
G4=(R9)
Or, S2' can contain 2 groups of disjoint and dependent rules:
S2'=(G1, G2)
G1=(R1, R2, R3, R5), disjoint, sub-linear
G2=(R4, R6, R7, R8, R9), dependent, linear 2) Example of Transform Function
A rule R usually consists of an N-tuple, most basically a 3-tuple such as "from 1.2.3.4 to 3.4.5.6 deny"
tuple a=source IP address, e.g. "1.2.3.4"
tuple b=destination IP address, e.g. "3.4.5.6"
tuple c=action, e.g. "deny"
Each of these tuples have underlying scalar integer/bit vector representation, so in the above example:
source IP address="1.2.3.4"=32 bit integer 0016909060
destination IP address="3.4.5.6"=32 bit integer 0050595078
action="deny"=8 bit integer 000
One possible transform function is a transform to scalar key which concatenates the digits of each of the tuples into a large integer value:
T(a, b, c)=abc
T(1.2.3.4, 3.4.5.6, deny)=0016909060 0050595078 000=0016909060005059507 8000
Another possible transform function is a transform to scalar key which concatenates the bits of each of the tuples into a large integer/bit vector:
a=1.2.3.4=00000001000000100000001100000100 (32 bits)
b=3.4.5.6=00000011000001000000010100000110 (32 bits)
c=0=00000000 (8 bits)
T(a, b, c)=abc=000000010000001000000011000001000000001100000100000001010000 0110000000000
Another possible transform function is an identity function (i.e. transformation function that does not do anything), then defining a multi-dimensional comparison function for sorting purposes. An example of this is a comparison function that is radix-based for each tuple, which would essentially result in a rule set that is radix sorted by each tuple.

Note that the transform function must convert the rule into a sortable key, which does not necessarily have to be a scalar key (i.e. it can be a multi-dimensional key that uses a multi-dimensional comparison function for sorting).

3) Definition of Rule Representation.
Rule representation is the way a rule and a rule set are conceptually represented in software. The most common representation of a rule is as an N-tuple object or structure that simply holds all the tuples together:

```
struct rule {
    unsigned char ip_proto;
    unsigned int ip_src_addr;
    unsigned int ip_dst_addr;
    unsigned short ip_src_port;
    unsigned short ip_dst_port;
    ...
    unsigned char action;
};
```

The most common representation of a rule set is an array or linked list that hold the rules in a fixed order, and allows for iteration forwards and backwards in the array or list.
Example of Array:

| memory location | 0 | 1 | 2 | 3 | 4 | 5 | 6 | 7 | 8 |
|---|---|---|---|---|---|---|---|---|---|
| value | R1 | R2 | R3 | R4 | R5 | R6 | R7 | R8 | R9 |

Example of Linked List:
An alternate rule representation is to hold the rule and rule set in a trie or other graph structure. An example of this is described in "Balancing Trie-Based Policy Representations for Network Firewalls." Stephen J. Tarsa and Errin W. Fulp. Proceedings of the IEEE International Symposium on Computer Communications, 2006
Another alternate rule set representation is a hierarchical one as described in OPTWALL, described in Acharya et al., "OPTWALL: A Hierarchical Traffic-Ware Firewall," available at:
http://www.isoc.org/isoc/conferences/ndss/07/papers/OPT-WALL.pdf,
where rule sets are broken down into mutually exclusive rule subsets which are arranged in a hierarchical order. Despite some similarities in terminology, OPTWALL and APF are different. For example, APF does not change the underlying rule or rule set representation. It simply reorders the rules in place and keeps track of the beginning and ending rules in each subset T externally from the rule or rule set. For example, say that a given rule is a standard structure and the rule set is an array form so that the rule set contains the following in the computer's memory:
Rule set S:

| Location | 0 | 1 | 2 | 3 | 4 | 5 | 6 | 7 | 8 |
|---|---|---|---|---|---|---|---|---|---|
| value | R1 | R2 | R3 | R4 | R5 | R6 | R7 | R8 | R9 |

Suppose that the above rule set S can be divided into subsets containing disjoint rules:
T1=R2, R9, R1, R3
T2=R5, R7
T3=R2, R4, R8 so that

S'=T1, T2, T3=R2, R9, R1, R3, R5, R7, R2, R4, R8

Then the order of the rules in memory can be changed in place:

Rule set S':

| location | 0 1 2 3 | 4 5 | 6 7 8 |
|---|---|---|---|
| value | R2 R9 R1 R3 \|---------\| T1 | R5 R7 \|---\| T2 | R2 R4 R8 \|------\| T3 |

The memory ranges for T1 (0-3), T2 (4-5) and T3 (6-8) are stored outside of the rule and rule set data structures.

4) Difference Between Linear and Sub-Linear.

A linear algorithm is one whose computational time increases linearly as the size of the set is increased. The best example of this is when looking up a word in a dictionary. If the dictionary is unsorted, then the order of the words would be arbitrary. Therefore, when looking up the word "zebra," one could start from the beginning and search until the end to find it. If the dictionary contains 1,000 entries, you would need to examine all 1,000 words in the worst case.

A sub-linear algorithm is one whose computational time increases sub-linearly as the size of the set is increased. In the above example, if the dictionary were sorted alphabetically, then one could still use a linear search by starting from the beginning and searching until the end to find "zebra." However, one could also use a sub-linear binary search algorithm by looking in the middle of the dictionary, then seeing if the middle entry comes alphabetically before or after (or is equal), then recursively selecting the middle of the appropriate half again and again to find the word "zebra." Since at each recursion ½ of the remaining words are eliminated, it would take about $\log_2 (1,000)$ or about 10 examinations to find the entry in the worst case.

Another example of a sub-linear algorithm is hashing. Suppose that the above dictionary contains only 5 letter words. If we define a hash function that sums the alphabet order of each letter in the word (z=26, e=05, b=02, r=18, a=01), then hash ("zebra")=26+05+02+18+01=52. The computer could have an array containing all the words in the dictionary where each word's position in the array is the hash value of the word (subject to collisions). In the above example, the array's 52nd position would have the word "zebra," so it would take only 1 comparison to determine a match without collision. This hash technique can be selectively used in APF.

5) Explanation of Disjoint Rules.

A rule R1 is "disjoint" from another rule R2 if their positions in the rule set S can be exchanged without altering the overall security policy. An example of this is rule set S containing:

R1=from 1.*.*.* to 2.3.4.5 deny
R2=from 1.2.3.4 to 1.2.3.4 allow has the same security policy as rule set S' containing:

R2=from 1.2.3.4 to 1.2.3.4 allow
R1=from 1.*.*.* to 2.3.4.5 deny because P=P'; therefore, R1 and R2 are disjoint.

The technique set forth above does not explain the concept of "spatially disjoint" rules. This is important if the transform function T cannot account for overlapping tuple values, which can be very common in practical settings.

A rule R1 is "spatially disjoint" from another rule R2 if they are "disjoint" and their corresponding tuples do not unevenly overlap (must be exactly equal, or do not overlap at all). In the above example, R1 and R2 are disjoint but not spatially disjoint because the first tuple of R1 (1.*.*.*) and R2 (1.2.3.4) are not equal but do overlap, i.e. the value of 1.2.3.4 would match the first tuple of both R1 and R2. An example of spatially disjoint rules are:

R3=from 1.2.3.4 to 3.4.5.6 deny
R4=from 2.3.4.5 to 3.4.5.6 allow

Here, the first tuple of R1 (1.2.3.4) and the first tuple of R2 (2.3.4.5) do not overlap, the second tuple of R1 (3.4.5.6) and R2 (3.4.5.6) are equal, and the >> third tuple of R1 (deny) and R2 (allow) do not overlap.

The importance of "spatially disjoint" rules is dependent upon the definition of a transform function T, so it may be possible to define T such that rules need not be "spatially disjoint" so long as rules are "disjoint."

The disclosure of each of the publications referenced herein is hereby incorporated by reference in its entirety.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for adaptive packet filtering, the method comprising:

identifying, from rules in an ordered set of firewall packet filtering rules that defines a firewall policy, disjoint rule groups containing disjoint rules, where disjoint rules are defined as rules whose order can be changed without changing the integrity of the firewall policy, wherein each rule includes n tuples, the n tuples for each rule including at least a first tuple comprising an entire source address, a second tuple comprising an entire destination address, and a third tuple comprising an action, wherein each disjoint rule group contains rules that are disjoint from all other rules in the disjoint rule group wherein each of the rules in the ordered set is classified into a disjoint rule group;

sorting the rules within the disjoint rule groups using a comparison function that considers, for each sort of each rule, the aggregate of the n tuples and the entirety of each of the n tuples in each rule being sorted so that the rules can be searched using a sub-linear search algorithm;

filtering packets at the firewall using the sorted rules in the disjoint rule groups by searching the sorted rules in the disjoint rule groups using the sub-linear search algorithm that uses the comparison function until the packet is allowed or denied and ceasing the searching in response to the packet being allowed or denied; and consolidating disjoint rule groups having less than a threshold number of rules to form dependent rule groups and refraining from sorting the rules in the dependent rule groups and wherein filtering the packets includes filtering the packets using the disjoint rule groups and the dependent rule groups, thereby achieving sub-linear searching for the disjoint rule groups and achieving linear searching for the dependent rule groups.

2. A system for adaptive packet filtering, the system comprising:

a firewall rule subset identifier/rule sorter for identifying, from rules in an ordered set of firewall packet filtering rules that defines a firewall policy, disjoint rule groups containing disjoint rules, where disjoint rules are defined as rules whose order can be changed without changing integrity of the firewall policy, wherein each rule includes n tuples, the n tuples for each rule including at least a first tuple comprising an entire source address, a second tuple comprising an entire destination address, and a third tuple comprising an action, wherein each disjoint rule group contains rules that are disjoint from all other rules in the disjoint rule group and wherein each of the rules in the ordered set of packet filtering rules is classified into a disjoint rule group and for sorting the rules in the disjoint rule groups using a comparison function that considers, for each sort of each rule, the aggregate of the n tuples and the entirety of each of the n tuples in each rule being sorted so that the rules can be searched using a sub-linear search algorithm;

a packet filter for filtering packets at the firewall using the sorted rules in the disjoint rule groups by searching the sorted rules in the disjoint rule groups using the sub-linear search algorithm that uses the comparison function until the packet is allowed or denied and ceasing the searching in response to the packet being allowed or denied; and wherein the firewall rule subset identifier/rule sorter merges disjoint rule groups having less than a threshold number of rules to form dependent rule groups and refrains from sorting the rules in the dependent rule groups and wherein the firewall packet filter filters the packets using the disjoint rule groups and the dependent rule groups, thereby achieving sub-linear searching for the disjoint rule groups and achieving linear searching for the dependent rule groups.

3. A method for adaptive packet filtering, the method comprising:

identifying, from rules in an ordered set of firewall packet filtering rules that defines a firewall policy, disjoint rule groups containing disjoint rules, where disjoint rules are defined as rules whose order can be changed without changing the integrity of the firewall policy, wherein each rule includes n tuples, the n tuples for each rule including at least a first tuple comprising an entire source address, a second tuple comprising an entire destination address, and a third tuple comprising an action, wherein each disjoint rule group contains rules that are disjoint from all other rules in the disjoint rule group wherein each of the rules in the ordered set is classified into a disjoint rule group;

sorting the rules within the disjoint rule groups using a comparison function that considers, for each sort of each rule, the aggregate of the n tuples and the entirety of each of the n tuples in each rule being sorted so that the rules can be searched using a sub-linear search algorithm;

filtering packets at the firewall using the sorted rules in the disjoint rule groups by searching the sorted rules in the disjoint rule groups using the sub-linear search algorithm that uses the comparison function until the packet is allowed or denied and ceasing the searching in response to the packet being allowed or denied; and wherein identifying the disjoint rule groups comprises:

(a) creating a new empty disjoint rule group and placing a first ungrouped rule in the ordered set into the empty disjoint rule group; and (b) for each ungrouped rule in the ordered set:
  (i) placing the rule in the disjoint rule group if the rule is disjoint from all rules in the disjoint rule group; and
  (ii) leaving the rule ungrouped if the rule is not disjoint from all of the rules in the disjoint rule group and repeating steps (a) and (b) until all rules in the ordered set of packet filtering rules are grouped into disjoint rule groups.

4. A system for adaptive packet filtering, the system comprising:

a firewall rule subset identifier/rule sorter for identifying, from rules in an ordered set of firewall packet filtering rules that defines a firewall policy, disjoint rule groups containing disjoint rules, where disjoint rules are defined as rules whose order can be changed without changing integrity of the firewall policy, wherein each rule includes n tuples, the n tuples for each rule including at least a first tuple comprising an entire source address, a second tuple comprising an entire destination address, and a third tuple comprising an action, wherein each disjoint rule group contains rules that are disjoint from all other rules in the disjoint rule group and wherein each of the rules in the ordered set of packet filtering rules is classified into a disjoint rule group and for sorting the rules in the disjoint rule groups using a comparison function that considers, for each sort of each rule, the aggregate of the n tuples and the entirety of each of the n tuples in each rule being sorted so that the rules can be searched using a sub-linear search algorithm;

a packet filter for filtering packets at the firewall using the sorted rules in the disjoint rule groups by searching the sorted rules in the disjoint rule groups using the sub-linear search algorithm that uses the comparison function until the packet is allowed or denied and ceasing the searching in response to the packet being allowed or denied; and wherein identifying the disjoint rule groups comprises:

(a) creating a new empty disjoint rule group and placing a first ungrouped rule in the ordered set into the empty disjoint rule group; and (b) for each ungrouped rule in the ordered set:
  placing the rule in the disjoint rule group if the rule is disjoint from all rules in the disjoint rule group; and
  (ii) leaving the rule ungrouped if the rule is not disjoint from all of the rules in the disjoint rule group and repeating steps (a) and (b) until all rules in the ordered set of packet filtering rules are grouped into disjoint rule groups.

5. A non-transitory computer readable medium having stored thereon on executable instructions that when implemented by a processor of a computer controls the computer to perform steps comprising:

identifying, from rules in an ordered set of firewall packet filtering rules that defines a firewall policy, disjoint rule groups containing disjoint rules, where disjoint rules are defined as rules whose order can be changed without changing integrity of the firewall policy wherein each rule includes n tuples, the n tuples including at least a first tuple comprising an entire source address, a second tuple comprising an entire destination address, and a third tuple comprising an action, wherein each disjoint rule group contains rules that are disjoint from all other rules in the disjoint rule group and wherein each of the rules in the ordered set is classified into a disjoint rule group;

sorting the rules within the disjoint rule groups using a comparison function that considers, for each sort of each rule, the aggregate of the n tuples and the entirety of each of the n tuples in each rule being sorted so that the rules can be searched using a sub-linear search algorithm;

filtering packets at the firewall using the sorted rules in the disjoint rule groups by searching the sorted rules in the disjoint rule groups using the sub-linear search algorithm that uses the comparison function until the packet is allowed or denied and ceasing the searching in response to the packet being allowed or denied and thereby achieving sub-linear searching for the packets filtered using the sorted rules in at least one subset; and
wherein identifying the disjoint rule groups comprises:
(a) creating a new empty disjoint rule group and placing a first ungrouped rule in the ordered set into the empty disjoint rule group; and
(b) for each ungrouped rule in the ordered set:
   (i) placing the rule in the disjoint rule group if the rule is disjoint from all rules in the disjoint rule group; and
   (ii) leaving the rule ungrouped if the rule is not disjoint from all of the rules in the disjoint rule group and repeating steps (a) and (b) until all rules in the ordered set of packet filtering rules are grouped into disjoint rule groups.

* * * * *